Figure 1:
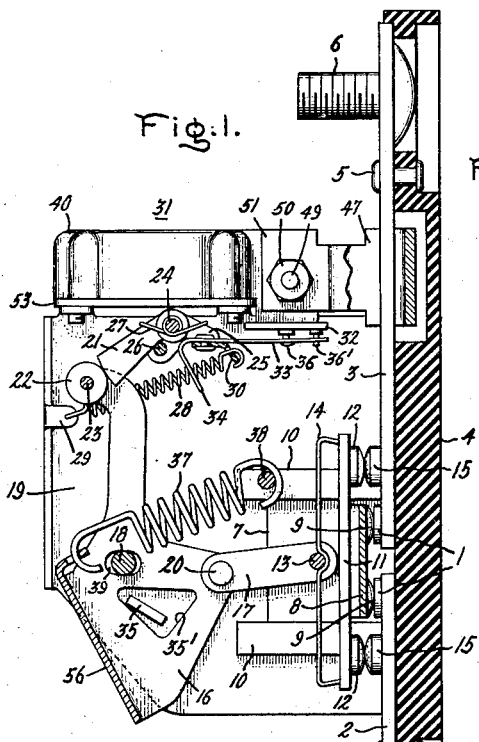

June 7, 1949.    C. D. HAYWARD    2,472,588
ELECTRIC SWITCH
Filed Nov. 2, 1944

Inventor:
Claude D. Hayward,
by Harry E. Dunham
His Attorney.

Patented June 7, 1949

2,472,588

UNITED STATES PATENT OFFICE 2,472,588

ELECTRIC SWITCH

Claude D. Hayward, Lansdowne, Pa., assignor to General Electric Company, a corporation of New York Application November 2, 1944, Serial No. 561,539

12 Claims. (Cl. 200—106)

My invention relates to improvements in electric switches and more particularly to improvements in circuit breakers and especially lightweight, quick opening, direct current circuit breakers, the tripping of which is effected by a flux shifting action based on the direction of flow of current through the circuit breaker.

Reverse current tripping devices for circuit breakers have usually embodied a polarizing coil which is energized from the line voltage. In many applications, this is not desirable because the device is liable to trip on loss of voltage. For aircraft applications, the use of a potential coil is also undesirable because of the additional wiring required and the increase in weight. Reverse current tripping devices embodying polarization by permanent magnets as heretofore constructed were liable to demagnetization by heavy reverse currents. Such currents might even hold the armature in the attracted position, particularly in direct current systems embodying several high current generating sources connected to a bus as in some airplane installations. In such systems, a fault in one generator results in such a heavy reverse current flow to that generator as to render the usual reverse current tripping device inoperative. Inasmuch as weight is a major controlling factor in aircraft installations, simplicity of structure involving the minimum number of parts for satisfactory current conducting and interrupting capacities is essential. Also, ruggedness of structure and sensitivity of response to small reverse currents without reversed magnetization of the permanent magnet and failure to operate in consequence of large reverse currents are necessary.

An object of my invention is to provide a lightweight circuit breaker which has relatively high current conducting and interrupting capacities and which embodies a minimum number of parts and simplicity of structure. Another object of my invention is to provide a circuit breaker having a unitary reverse current tripping structure which is polarized by a permanent magnet and which is responsive to relatively small reverse currents without being rendered inoperative by relatively high reverse currents. Still another object of my invention is to provide a reverse current tripping device, the release of the armature of which is effected substantially independently of the friction load and inertia of the circuit breaker latching mechanism and associated parts. A further object of my invention is to provide an improved circuit breaker structure wherein the means used to bias the circuit breaker to the circuit open position after tripping is effective while the circuit breaker is in the circuit closed position to maintain the desired pressure between the contacts. These and other objects of my invention will hereinafter appear in more detail.

In accordance with my invention, I provide an improved electric switch mechanism embodying a single operating toggle which is held in an underset position by a latch to maintain the switch in the closed circuit position. Also in accordance with my invention, one link of the toggle is an operating member which is mounted for both rotary and translatory movements so that a biasing means for opening the switch is effective when the switch is held closed by the latch to produce a desired pressure between the contacts of the switch. Again in accordance with my invention, I provide a reverse current tripping device embodying a permanent magnet and a plurality of low retentivity magnetic elements so arranged as to prevent demagnetization of the permanent magnet by heavy reverse currents without loss of sensitivity on relatively small reverse currents. Further in accordance with my invention, the unitary magnetic structure embraces a yoke member, one leg of which is finely adjustable to vary the sensitivity of response. Still further in accordance with my invention, I so arrange the armature of the tripping magnet structure that it is biased to move from the attracted position independently of the friction load and inertia of the latch and its associated parts.

My invention will be better understood from the following description when considered in connection with the accompanying drawing, and its scope will be pointed out in the appended claims.

Figure 2:
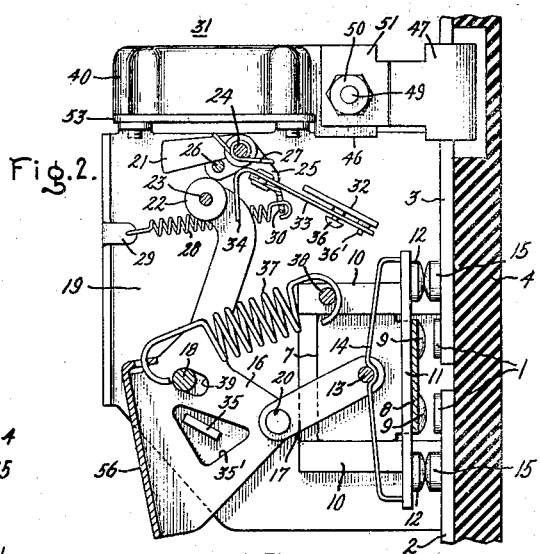
Figure 3:
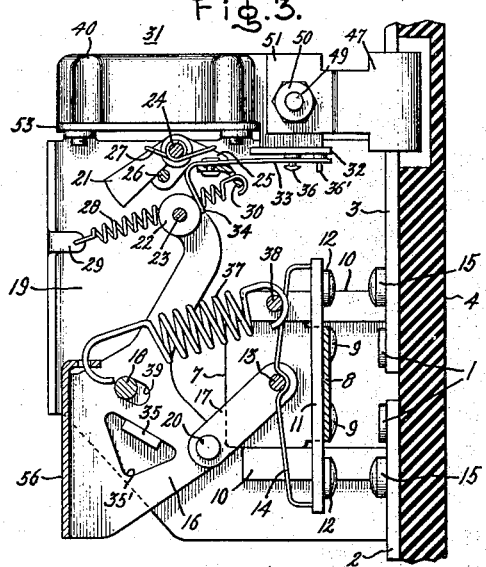
Figure 5:
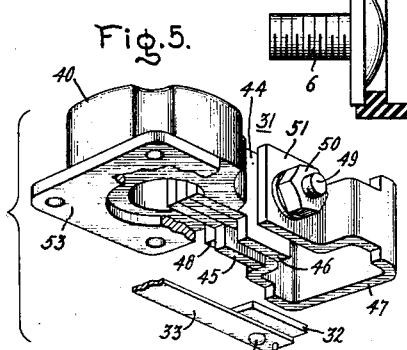
Figure 6:
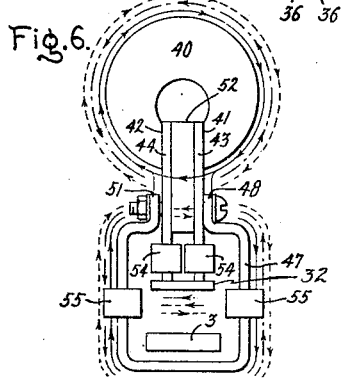
Figure 4:
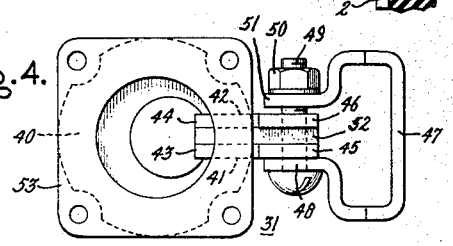

In the accompanying drawing, Fig. 1 is a side elevation of a circuit breaker embodying my invention and shown in the circuit closed position; Fig. 2 is an elevation similar to Fig. 1 showing the circuit breaker tripped and the main contacts separated; Fig. 3 is an elevation similar to Fig. 1 showing the circuit breaker in the full open position; Fig. 4 is a plan view of the magnetic structure of the reverse current tripping device as seen from the lower side; Fig. 5 is a perspective view of the reverse current tripping device; and Fig. 6 is an explanatory diagram illustrating the reverse current tripping device.

In the illustrated embodiment of my invention, I have shown an electric switch in the form of a circuit breaker comprising stationary contacts, such as silver blocks or pads 1, which are suitably secured to spaced conductor bars 2 and 3, respectively. These bars are secured to a suitable mounting such as a base 4 of insulating material by rivets 5 and are provided with terminals 6. For bridging the gap between the stationary contacts 1, I provide a cooperating bridging contact which, as shown, takes the form of a U-shaped member 7 of suitable conducting material on the base 8 of which two suitable contacts, such as rounded silver blocks or pads 9, are suitably secured. Each leg of the U-shaped member or bridging contact 7 is mounted for rectilinear movement between guides 10 of insulating material suitably secured to or forming a part of the base 4. For arc interrupting purposes, I provide another bridging member 11, which is provided with suitable arcing contacts 12 and which is supported between a projection such as a pin 13 on the bridging contact 7 and the base 8 thereof by a bowed spring 14 so as to effect the closing of the arcing contacts 12 and cooperating arcing contacts 15 on the conductor bars 2 and 3 before the closing of the main contacts 1 and 9 and opening of the main contacts prior to the opening of the arcing contacts.

For closing the circuit breaker, I provide a rotatably mounted operating member 16 and a link 17 which interconnects the bridging contact 7 and the operating member and forms therewith a toggle for effecting a circuit closing movement of the bridging contact when the operating member is turned in one direction, counterclockwise as shown in the drawing. The operating member 16 is rotatably supported on a pin 18 secured in the circuit breaker frame 19, and the link 17 is pivotally connected to the operating member at 20 and to the bridging contact 7 at the pin 13.

For maintaining the bridging contact 7 in the closed circuit position with the toggle formed by the operating member 16 and the link 17 in a predetermined underset position from the line of the toggle extending through the pivot 18 and the pin 13, I provide means such as a latch or prop 21, which is offset substantially in quadrature with the line of the toggle on one side of the pivot 18 so as to be engageable with the quadrantal upper end of the operating member 16 upon a predetermined counterclockwise rotation thereof, for holding the operating member against rotation in the opposite direction, clockwise as shown in the drawing. In order to reduce the latch friction load to a minimum, the operating member 16 is provided with a roller 22, which is pivoted on the quadrantal end of the operating member at 23 and against which the latch abuts in the holding position. In order that the roller 22 may pass under the latch 21 during the circuit closing operation, the latch is pivoted at 24 on a support 25 which is mounted on a pivot 26 in the circuit breaker frame. Also, I provide resilient means such as a spring 27 which tends to turn the latch 21 counterclockwise into the latching position against the pin 26 as soon as the roller 22 passes by the end of the latch in the circuit closing operation.

For biasing the latch 21 to the releasing position, I provide suitable means such as a spring 28 which is connected between an ear 29 on the circuit breaker frame 19 and an arm 30 of the latch support 25. For maintaining the latch in the holding position against the bias of the spring 28, I provide a permanent magnet polarized flux shifting electroresponsive means 31 comprising an armature 32 loosely mounted on a resilient arm 33 extending from the latch support 25. The electroresponsive means 31 will be described in detail hereinafter. For resetting the armature 32 during the circuit opening operation of the circuit breaker, I provide the support 25 with a preferably resilient arm 34 which may be integral with the arm 33 and which is positioned in the path of movement of the roller 22 as the operating member 16 is turned clockwise during the circuit opening operation. This action will be more clearly apparent from an observation of Figs. 2 and 3. In order to limit the circuit opening movement or clockwise rotation of the operating member 16 and the parts secured thereto, I provide suitable means such as a stop 35 which, as shown, is secured to the circuit breaker frame 19 and extends through an opening 35' in the operating member 16.

In order to have the release of the armature 32 under predetermined electrical conditions of the circuit through the circuit breaker independent of the friction load and inertia of the latch 21 and its support 25, the armature is loosely supported on the resilient arm 33 by suitable means such as a rivet 36. This loose mounting also facilitates movement of the armature to an even bearing on its attracting poles. The rivet 36 is positioned substantially at the center of gravity of the armature 32 and is of such a length relatively to the support 25 that the arm 33 in the closed circuit position of the switch is so stressed as to tend to snap the armature from its attracted position upon release of the armature by the magnetic device 31 before any movement of the support 25 and the latch 21 occurs. For maintaining the alignment of the armature relatively to the arm 33, the armature is provided with suitable means such as a guide pin 36' projecting through an opening in the arm 33 large enough to allow movement of the arm relatively to the pin.

For effecting the circuit opening operation of the circuit breaker upon the release of the latch 21, I provide resilient means such as a spring 37 which is connected to the operating member 16 laterally adjacent the slot 39 for the pivot 18 and to a stationary pin 38 on the circuit breaker and which is arranged to be stressed during the circuit closing movement of the operating member so as to exert a force in a direction always slightly offset from the line of the toggle on the same side of pivot 18 as the latch 21. Thus, in accordance with my invention, I so arrange the direction and application of the pull of the spring 37 that, as long as the operating member 16 is held in the closed circuit position, most of the force of the spring is exerted in a direction along the line of the toggle and thus bias the toggle to maintain the desired pressure between the main contacts 1 and 9 and the arcing contacts 12 and 15. To secure the utmost from this force, the operating member 16 is arranged to have a limited translatory movement relatively to its pivot 18. For this purpose, the opening for the pivot 18 is in the form of a slot 39 whose length extends in such a direction near the end of the circuit closing movement that the operating member is free to move substantially in the direction of the movements of the bridging contact, as shown in Fig. 1. Thus, when the switch is closed, the large component of the force of the spring 37 perpendicular to the base 4 is opposed by the reaction at the contacts. Consequently there is very little friction on the pin 18 since the component of the spring force parallel to the base is relatively small. Furthermore, with the spring 37 connected to the operating member 16 laterally adjacent the slot 39 for pivot 18 on the latch side of the line of the toggle, the effective contact opening torque arm is short relative to the elongated quadrantal holding end of member 16 carrying the roller 22 that is engaged by latch 21. Accordingly only a relatively small reaction between the latch 21 and the roller 22 has to be overcome to trip the switch. Also by reason of the translatory movement of the operating member 16 on its pivot 18 substantially in the direction of movement of the bridging contact 7, the spring 37 also acts to compensate for wear of the contact surfaces by maintaining the same contact pressure.

Upon release of the latch 21, the spring 37 so moves the operating member that the pin 18 bears against the outer end of the slot 39, as shown in Figs. 2 and 3. The spring 37 is thus effective to produce the desired circuit opening movement of the operating member 16 and its associated parts.

In accordance with my invention, the electroresponsive tripping device 31, which is of the flux shifting type, comprises a polarizing permanent magnet 40 having two opposed spaced substantially parallel pole faces 41 and 42, two low retentivity iron pole pieces 43 and 44 respectively secured thereto and having pole faces 45 and 46 respectively, a low retentivity iron yoke member 47 rigidly attached at one end 48 to the pole piece 43, and threaded means 49 and 50 for so positioning the other end 51 of the yoke member adjacent the other pole piece 44 as to vary the gap between them and thereby the sensitivity of response to the tripping current. Between the pole pieces 43 and 44 there is mounted a suitable nonmagnetic spacer 52. For best results, the permanent magnet 40 is preferably of the Alnico type. Inasmuch as certain machining operations on this metal are difficult and costly, I preferably combine the foregoing parts into a unitary structure by suitably bonding the permanent magnet 40 to a nonmagnetic base plate 53 which can readily be bolted to the circuit breaker frame 19, as shown. Thus, for example, the permanent magnet 40 is soldered or otherwise permanently secured to the plate 53. The pole pieces 43 and 44 are also similarly secured to the plate 53 and to the permanent magnet pole faces 41 and 42 with the spacer 52 between them and similarly secured to the plate 53 and to the pole pieces 43 and 44. Also, the end 48 of the yoke 47 is likewise bonded to the pole piece 43. This arrangement eliminates the necessity for any costly machining operations on the Alnico permanent magnet 40. The weight of fastening means, such as bolts and the like, which would become loose under the vibrations and jars of aircraft operation, is also eliminated since the bonding of parts requires the very minimum of extra material. However, as far as my invention is concerned this unitary feature although desirable is not necessary.

Reference will now be had to Fig. 6 to explain more in detail the construction and operation of the tripping device 31. In this schematic figure, the armature 32 is turned 90° from its position shown in the other figures and placed at the yoke end of the pole pieces 43 and 44 for simplicity in showing and explanation. The solid lines with the arrows indicate the flow lines of the flux of the permanent magnet 40 assuming no other energization of the magnetic structure. Thus, for example, the permanent magnet flux tends to flow from the permanent magnet 40 through the pole piece 43, the armature 32, the pole piece 44 and return; also, through the pole piece 43 and across the gap spacer 52 into the pole piece 44 and return; and, also, through the pole piece 43 into the yoke member 47 to the pole piece 44 and return. The relative reluctances of these three magnetic circuits under these conditions are such that when the armature 32 is moved to the attracted position during the opening movement of the operating member 16, the armature tends to remain in the attracted position.

In order to release the armature from this position in response to reverse current through the circuit breaker, the conductor bar 8 is arranged within the yoke 47 so as to magnetize the tripping magnetic structure in accordance with the magnitude and direction of the current through the circuit breaker. Assuming now that current flow is in the normal or forward direction, then in Fig. 6 the dash-dot lines with the arrows indicate the flow lines the flux due to the circuit current tends to take. Thus, for example, the forward current flux flows from the yoke end 48 into the pole piece 43 and across the gap spacer 52 to the pole piece 44 and across the yoke adjustment gap into the yoke end 49 and return to the yoke 47; also, from the yoke end 48 into the pole piece 43 through the armature 32 into the pole piece 44 and across the yoke adjustment gap into the yoke end 49 and return to the yoke 47; and, also, from the yoke end 48 through the pole pieces 43, the permanent magnet 40, the pole piece 44 and the yoke adjustment gap into the yoke end 49 and return to the yoke 47. It will be noted that under these conditions the flux due to the circuit current assists the flux from the permanent magnet 40 to hold the armature 32 in the attracted position. In view of the two flux paths in parallel with the permanent magnet, it will be apparent that little, if any, of the direct current flux will flow in the permanent magnet itself. Assuming now that current flow is reversed, then the dotted lines with the arrows indicate the flow lines the flux, due to the reverse circuit current, tends to take. Thus, for example, the reverse current flux flows from the yoke end 51 across the yoke adjustment gap into the pole piece 44 and through the armature 32 and pole piece 43 to the yoke end 48 and return to the yoke 47; also, from the yoke end 51 across the yoke adjustment gap into the pole piece 44 and across the spacer gap 52 into the pole piece 43 and the yoke end 48 and return to the yoke 47; also from the yoke end 51 across the yoke adjustment gap into the pole piece 44 through the permanent magnet 40 to the pole piece 43, the yoke end 48 and return to the yoke 47. Thus, under reverse current conditions, it will be noted that the flux in the armature 32 due to the reverse current opposes the permanent magnet flux in the armature whereby to effect the release of the armature. What flux, if any, due to the reverse current flows through the permanent magnet, it will be noted, flows in the same direction as the permanent magnet flux and thereby tends to magnetize the permanent magnet in the right direction rather than to annul the flux of the permanent magnet. This is particularly important in applications such as those for which my device is intended where the magnitude of the reverse current in comparison with the normal current is so great that if the flux due to the reverse current opposes the permanent magnet flux, it would soon weaken, if not entirely eliminate, the desired action of the permanent magnet.

In order to obtain the desired operation, I have found that certain factors must be provided. Thus, the permanent magnet 40 must be large enough to supply the necessary holding flux through the armature 32 and, in addition, supply flux through the shunt gap of the spacer 52 and the yoke 47 in addition to some leakage flux. The pole pieces 43 and 44 must have a reluctance low enough to prevent change of the strength of the permanent magnet 40 on the maximum forward or reverse currents and must be of sufficient cross section to prevent saturation while carrying the flux to which they are subjected under these conditions. The cross sectional area of the yoke 47 is arranged to saturate with two purposes in mind. First, this yoke must saturate so that most of the magnetomotive force due to the maximum current in either the forward or reverse directions will be absorbed in drop across the reluctance of this part of the circuit rather than across the shunt gap. It is desirable to limit the magnetomotive force applied across the shunt gap spacer 52 to a value which would avoid change in the strength of the permanent magnet 40. The yoke 47 should also saturate on high reverse currents so that the flux, which passes through the armature by reason of the current through the circuit breaker and, which is in the reverse direction relative to the flux due to the permanent magnet, does not raise the net armature flux to such a high value in the reverse direction that the armature will be prevented from tripping out.

Because of the nicety of adjustment of the parts and the fact that the armature and its cooperating pole faces are subject to rusting, I find it desirable to coat these surfaces so that they will not rust. The coating must, of course, be thin so that the reluctance introduced into the magnetic circuit is not excessive. On the other hand, the coating must not be so thin that unavoidable variations in the fit of the armature surfaces due to slight surface irregularities or microscopic dust change the reluctance by an intolerably large percent as the armature is parted from the poles and reseated on successive operation. I have found that chromium plating the surface of the armature 32 and its cooperating pole faces 45 and 46 on the pole pieces 43 and 44 produces the desired results because such plating is extremely hard and does not wear and thereby change the gap reluctance appreciably. Also, such chromium plating does not form salts which would tend to form on the surfaces and change the gap reluctance or cause the closely fitted surfaces to stick. Furthermore, traces of chromium plating solution left in the joint cracks of assemblies placed in the plating tank and difficult to wash out do not cause subsequent corrosion as do traces of other plating solutions. On the contrary, they tend to prevent corrosion rather than to promote it. Also, the thickness and uniformity of the plating can be accurately controlled. I believe that chromium plating in the range of 0.00025" to 0.005" for magnetic armature and pole surfaces is a good range for the thickness. Actually, I have found 0.0005" to provide a very good practical value.

In some electrical systems where circuit breakers embodying my invention have been installed, it has been found that these circuit breakers would occasionally trip under conditions of normal operation when no fault was present in the generator circuit. This tripping is caused by a pulse of reverse current flowing from the bus back into a generator, occurring, for example, when the speed of the motive means driving the generator is suddenly reduced. The generator voltage regulator responds to the reduced generator voltage due to the suddenly reduced armature speed and begins raising the field current to compensate. Due to the time lag of the response, there is a short period when the generator voltage is lower than the bus voltage and a reverse current flows. The generator cutout relay starts to operate and would disconnect the generator after a short interval if it were not for the fact that circuit breakers embodying my invention are faster and trip first.

In order to prevent this unnecessary tripping, circuit breakers embodying my invention may be modified by adding copper lagging rings 54 around the pole pieces 43 and 44, as shown in Fig. 6. Further time delay may be obtained by adding similar rings 55 around the legs of the yoke 47, as indicated in Fig. 6. The purpose of these rings is to cause the magnetic flux change in the branches of the magnetic circuit they surround to lag behind the change in current flowing in the conductor bar 3. This produces a time delay in the tripping of the circuit breaker such that the short duration pulses of reverse current described above do not cause tripping. However, the lagging rings do not prevent the circuit breaker from tripping on sustained reverse currents due to actual generator faults. Actually the time delay caused by the lagging rings varies inversely with the magnitude of the current in the conductor bar 3 so that ample time delay can be obtained to prevent false tripping on the relatively low magnitude pulses without adding appreciably to the tripping time on high fault currents which require fast clearing in order to prevent excessive damage.

Referring now to Fig. 1 in which the circuit breaker is shown in the circuit closed position, it will be noted that the operating member 16 is held by the latch 21, which bears on the pin 26. Also, the support 25, which is biased by the spring 28 in a direction to effect the release of the latch 21, is held against turning by the armature 32 in the attracted position with the leaf spring 33 stressed in a direction tending to move the armature from the attracted position. As long as current flow through the circuit breaker is in the forward direction, conditions will be as indicated by the solid and dash-dot lines in Fig. 6 so that, regardless of the magnitude of the forward current, the armature 32 will not be released. Also, since the yoke 47 is arranged to saturate, the flux due to a heavy forward current will not seriously affect the permanent magnet 40. If now for any reason the direction of current flow in the circuit breaker is reversed, conditions will be as represented by the solid and the dotted lines in Fig. 6. Under these conditions, the holding effect of the flux in the armature 32 due to the permanent magnet 40 is annulled by the effect of the flux due to the reverse current and the armature 32 is released. Consequently it will be quickly snapped away from its associated poles by the force of the stressed spring 33 whereupon the spring 28 turns the latch 21 into the releasing position, shown in Fig. 2, and the spring 37 starts counterclockwise rotation of the operating member 16 to separate the contacts 9 from the contacts 1, as shown in Fig. 2. The operating member 16 continues to rotate in the clockwise direction until it comes to rest against the stop 35 and the arcing contacts 12 on the bridging member 11 are drawn away from the arcing contacts 15 on the conductor bars 2 and 3 finally to break the circuit. During the clockwise movement of the operating member 16, the roller 22 thereon engages the arm 34 of the leaf spring 33 so as to return the armature 32 to the attracted position, as shown in Fig. 3. To close the circuit breaker, it is only necessary to exert the necessary force on the flange 56 of the operating member 16 to turn it counterclockwise into the position shown in Fig. 1. In the particular embodiment of my invention illustrated, this closing operation can be performed merely by pressing on the flange 56 with the thumb. As the operating member is turned counterclockwise, the roller 22 engages the latch 21 and turns it clockwise against the bias of the spring 27 about its pivot 24 out of the way of the roller until the bridging contacts are engaged. During this clockwise movement of the latch, the spring 27 is stressed, and as the roller passes by the latch, the latch is quickly snapped to the holding position shown in Fig. 1.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. In a circuit breaker mechanism having a toggle comprising two pivotally interconnected link members, means for holding said toggle in a predetermined position comprising a stationary pivot, a support mounted to turn on said pivot, a latch pivotally mounted on said support and engageable with one of said link members upon movement of the toggle into said predetermined position, means yieldingly coupling said support and said latch and tending to bias the latch against said pivot, and magnetic means for maintaining said latch in the toggle holding position comprising an armature, a resilient arm for said armature rigidly secured to said support and loosely secured to said armature, and means biasing said support in a direction to release said latch from the holding position and stressing said resilient arm so as to tend to release the armature from the attracted position.

2. In a circuit breaker mechanism having a toggle comprising two pivotally interconnected link members, means for holding said toggle in a predetermined position comprising a stationary pivot, a support mounted to turn on said pivot, a latch pivotally mounted on said support and engageable with one of said link members upon movement of the toggle into said predetermined position, spring means coupling said support and said latch and tending to bias the latch against said pivot, and magnetic means for maintaining said latch in the toggle holding position comprising an armature, a leaf spring rigidly secured to said support and loosely secured to said armature, said leaf spring being stressed when the armature is in the attracted position and the latch is in the latching position so as to tend to move the armature upon release from the attracted position prior to movement of the latch, and a spring biasing said support in a direction to release said latch from the holding position upon release of the armature from the attracted position.

3. An electric switch comprising two spaced stationary contacts, a cooperating rectilinearly movable bridging contact, a rotatably mounted operating member having a mounting slot, a link interconnecting said bridging contact and said operating member and forming with the member a toggle for effecting circuit closing movement of the bridging contact upon a predetermined rotation of the member in one direction to align said slot for limited sliding movement of said member in the same direction as the rectilinear movement of said bridging contact, means including a latch offset substantially in quadrature with the line of the toggle opposite one side of said slot and engageable with said operating member upon said predetermined rotation thereof for holding the toggle to maintain the bridging contact in the closed circuit position, and a resilient member having a connection with said operating member laterally adjacent said one side of said slot and stressed during said predetermined rotation of said operating member for biasing said member to slide the toggle in the direction of circuit closing movement of the bridging contact while the toggle holding latch is effective and to turn in the direction to collapse the toggle and effect circuit opening movement of the bridging contact upon release of said latch.

4. An electric switch operating mechanism having in combination a rotatably mounted switch operating member, resilient means arranged to be stressed during a predetermined rotation of said operating member in one direction for biasing the operating member to turn in the opposite direction, a latch engageable with said operating member upon said predetermined rotation thereof for holding the member against rotation in the opposite direction, a pivotal support carrying said latch, means biasing said support to rotate said latch to the releasing position, and magnetic means for maintaining said latch in the holding position comprising an armature having a lost motion resilient connection with said support for stressing said connection when said armature is in the attracted position and said latch is in the holding position whereby to effect a snap relative movement of the armature away from the attracted position independently of the releasing rotative movement of the latch.

5. An electric switch comprising relatively movable cooperating contacts, a pivotally supported operating member having a mounting slot providing limited sliding movement relative to the pivot axis, a link interconnecting one of said contacts and said operating member and forming with the operating member a toggle for effecting circuit closing movement of said one contact upon a predetermined rotation of the operating member to align said slot with the line of the toggle, means including a latch substantially in quadrature with the line of the toggle opposite the pivot axis and engageable with said operating member upon said predetermined rotation thereof for holding the member against rotation in the opposite direction whereby to maintain said one contact in the closed circuit position, and resilient means having a connection with said operating member laterally adjacent said slot to be stressed during said predetermined rotation of the operating member to exert a force in a direction offset from the line of the toggle and transverse the line between the pivot axis and the point of engagement of the operating member by said latch for biasing said operating member both to turn about said point to effect limited sliding movement thereof relatively to its pivot axis in the direction of circuit-closing movement of said one contact and to turn about said pivot axis in a direction to effect the circuit opening movement of said one contact upon the release of said latch.

6. An electric switch comprising two spaced stationary contacts, a cooperating rectilinearly movable bridging contact, a pivotally mounted operating member having a mounting slot providing in one angular position thereof a limited sliding movement of the member towards and away from said stationary contacts, a link interconnecting said bridging contact and said operating member and forming with the member a toggle for effecting circuit closing movement of the bridging contact when the operating member is turned to said angular position, a latch offset on one side of the line of the toggle substantially opposite said slot and engageable with said operating member in said angular position for holding the member against rotation in the contact opening direction, resilient means connected to the operating member laterally adjacent said slot on said one side of the line of the toggle to be stressed during rotation of said member to said angular position for both biasing the toggle to maintain a pressure between said bridging contact and said stationary contacts while said latch is in the holding position and for turning the operating member to effect the circuit opening movement of said bridging contact upon the release of said latch.

7. An electric switch comprising a stationary contact, a cooperating rectilinearly movable contact, a stationary pivot substantially aligned with the line of movement of said movable contact, an operating member having a slot rotatable on said pivot and in a predetermined angular position of said member slidable a limited amount substantially along said line, a link interconnecting said movable contact and said operating member and forming with the operating member a toggle extensible along said line for effecting circuit closing movement of said movable contact when the operating member is turned to said predetermined angular position, a latch offset substantially opposite said pivot on one side of said line and engageable with said operating member in said predetermined position for holding the member therein to maintain the movable contact in the closed circuit position, and resilient means having a connection with said operating member laterally adjacent said slot on said one side of said line in said predetermined angular position thereof for biasing said operating member both to slide the toggle along said line in the direction of the circuit-closing movement of said movable contact and thereby maintain a pressure between said movable contact and said stationary contact while said latch is in the holding position and to turn the operating member from said predetermined angular position to effect the circuit opening movement of the movable contact upon the release of said latch.

8. In a circuit breaker operating mechanism, a toggle comprising two pivotally interconnected link members, means including a pivotally supported latch engageable with one of said link members upon movement of the toggle into a predetermined position for holding the toggle therein, means biasing said latch to the releasing position, and magnetic means for maintaining said latch in the holding position including an armature having connections with said latch including a resilient member stressed by said latch biasing means for effecting snap movement of the armature from the attracted position independently of movement of the latch by said biasing means.

9. An electric switch comprising a stationary contact, a cooperating movable contact, means for actuating said movable contact comprising a toggle having one link connected to the movable contact and the other link provided with a quadrantal end and a central mounting slot and pivot for rotation about said pivot to open and to close the contacts and for sliding relative to the pivot substantially in the contact closing direction when the toggle is nearly straight, means including a latch offset substantially in quadrature on one side of the line of the toggle and engageable with said quadrantal end for holding the toggle in the switch closed position, and biasing means having a connection with said other link laterally adjacent said slot on said one side of the line of the toggle to exert a force in a direction offset from and substantially parallel to the line of the toggle for effecting both contact opening rotative and contact closing sliding movements of said other link.

10. An electric switch comprising two substantially rigid stationary contacts, a cooperating substantially rigid bridging contact mounted for rectilinear movement, a stationary pivot substantially in alignment with said movement, a toggle having one link connected to said bridging contact and the other link provided with a quadrantal end and a central mounting slot to both turn and slide on said pivot in the direction of switch closing movement of the bridging contact when the toggle is nearly straight, means including a latch substantially in quadrature with the line of the toggle opposite said pivot and engageable with the quadrantal end of said other link for holding said end to maintain the bridging contact in the switch closed position, and a spring having one end fixed and the other connected to said other link laterally adjacent said slot to exert a force in a direction offset from and substantially parallel with the line of the toggle for effecting both contact opening rotative and contact closing sliding movements of said other link.

11. In a circuit breaker latching mechanism, a latch having means biasing the latch to move from a holding position to a releasing position, means for holding the latch in the holding position comprising a magnet provided with an armature having connections with said latch including a resilient member stressed by said latch biasing means when the armature is in the attracted position, and means for deenergizing said magnet sufficiently to release said armature, said resilient member because of the stress thereof while the armature is in the attracted position being operative upon release of the armature to snap the armature away from said magnet before the latch moves appreciably from the holding position.

12. In a circuit breaker latching mechanism, a latch having a pivotally mounted support, means biasing said support to rotate the latch from a holding position to a releasing position, means for holding the latch in the holding position comprising a magnet, a leaf spring carried by said pivotally mounted support, an armature cooperating with said magnet and loosely supported on said spring, said spring being stressed by said latch biasing means when the armature is in the attracted position, and countermagnetizing means for temporarily deenergizing said magnet sufficiently to release said armature, said spring because of the stress therein while the armature is in the attracted position being effective upon said temporary deenergization of said magnet to snap the armature away from said magnet independently of the releasing movement of the latch from the holding position.

CLAUDE D. HAYWARD.

REFERENCES CITED

The following references are of record in the file of this patent:

UNITED STATES PATENTS

| Number | Name | Date |
|---|---|---|
| Re. 17,304 | Knook | May 28, 1929 |
| 421,177 | Lemp | Feb. 11, 1890 |
| 522,527 | Larson | July 3, 1894 |
| 732,254 | Ball | June 30, 1903 |
| 1,532,212 | Wilms | Apr. 7, 1925 |
| 1,725,106 | Scott | Aug. 20, 1929 |
| 1,874,797 | Pavitt | Aug. 30, 1932 |
| 2,307,205 | Ewald et al. | Jan. 5, 1943 |
| 2,240,763 | Dillman | May 6, 1941 |

FOREIGN PATENTS

| Number | Country | Date |
|---|---|---|
| 15,226 | Great Britain | July 8, 1902 |
| 19,972 | Great Britain | Sept. 20, 1898 |